United States Patent
Sar-Shalom (10) Patent No.: US 8,984,118 B2
(45) Date of Patent: Mar. 17, 2015

(54) AUTOMATIC MESSAGING CLIENT LAUNCHER FOR A COMMUNICATION DEVICE

(75) Inventor: Yaron Sar-Shalom, Ramat Yishay (IL)

(73) Assignee: Comverse, Ltd. (IL)

( * ) Notice: Subject to any disclaimer, the term of this patent is extended or adjusted under 35 U.S.C. 154(b) by 1981 days.

(21) Appl. No.: 10/608,230

(22) Filed: Jun. 30, 2003

(65) Prior Publication Data

US 2004/0267884 A1 Dec. 30, 2004

(51) Int. Cl.
*G06F 15/173* (2006.01)
*H04M 1/725* (2006.01)

(52) U.S. Cl.
CPC ................................ *H04M 1/72547* (2013.01)
USPC ....................................................... 709/224

(58) Field of Classification Search
USPC ................ 709/204–206, 223–229; 379/88.13
See application file for complete search history.

(56) References Cited

U.S. PATENT DOCUMENTS

| | | | | |
|---|---|---|---|---|
| 6,160,995 A * | 12/2000 | Kiswani et al. | ............ | 379/88.12 |
| 6,169,796 B1 * | 1/2001 | Bauer et al. | ............... | 379/215.01 |
| 6,298,128 B1 * | 10/2001 | Ramey et al. | ............. | 379/142.01 |
| 6,301,609 B1 * | 10/2001 | Aravamudan et al. | ........ | 709/207 |
| 6,677,976 B2 * | 1/2004 | Parker et al. | ............... | 348/14.08 |
| 6,735,295 B1 * | 5/2004 | Brennan et al. | .......... | 379/215.01 |
| 6,757,365 B1 * | 6/2004 | Bogard | ....................... | 379/88.17 |
| 6,757,732 B1 * | 6/2004 | Sollee et al. | .................. | 709/227 |
| 6,859,529 B2 * | 2/2005 | Duncan et al. | ............. | 379/266.1 |
| 6,970,553 B1 * | 11/2005 | Gao et al. | ................. | 379/265.09 |
| 6,978,136 B2 * | 12/2005 | Jenniges et al. | ........... | 455/435.1 |
| 6,988,123 B2 * | 1/2006 | LeClair et al. | ................. | 709/201 |
| 7,065,197 B1 * | 6/2006 | Ramella-Pezza et al. | ........................ | 379/201.02 |
| 7,103,806 B1 * | 9/2006 | Horvitz | ........................... | 714/43 |
| 7,136,466 B1 * | 11/2006 | Gao | ............ | 379/93.23 |
| 7,227,937 B1 * | 6/2007 | Yoakum et al. | .......... | 379/201.01 |
| 7,287,056 B2 * | 10/2007 | Loveland et al. | ............. | 709/206 |
| 7,571,458 B1 * | 8/2009 | Eyal | .............................. | 725/137 |
| 7,761,104 B2 * | 7/2010 | Oh | ................................. | 455/466 |
| 2002/0073207 A1 * | 6/2002 | Widger et al. | ................ | 709/227 |
| 2002/0147983 A1 * | 10/2002 | Michael et al. | ............... | 725/106 |
| 2002/0152402 A1 * | 10/2002 | Tov et al. | ....................... | 713/201 |
| 2002/0174199 A1 * | 11/2002 | Horvitz | ........................ | 709/220 |
| 2003/0002645 A1 * | 1/2003 | Worsham et al. | ........ | 379/211.03 |
| 2003/0069934 A1 * | 4/2003 | Garcia-Martin et al. | ..... | 709/206 |
| 2003/0086540 A1 * | 5/2003 | Brandt | ............................ | 379/52 |
| 2003/0096626 A1 * | 5/2003 | Sabo et al. | ..................... | 455/466 |
| 2003/0112930 A1 * | 6/2003 | Bosik et al. | ................. | 379/88.17 |
| 2003/0112948 A1 * | 6/2003 | Brown et al. | ............. | 379/207.04 |
| 2003/0185360 A1 * | 10/2003 | Moore et al. | ............. | 379/114.01 |

(Continued)

OTHER PUBLICATIONS

Tyson et al.; How Instant Messagign Works; printed Apr. 28, 2009; http://communication.howstuffworks.com/instant-messaging.htm.*

*Primary Examiner* — Kenny Lin (74) *Attorney, Agent, or Firm* — Ohlandt, Greeley, Ruggiero & Perle, L.L.P.

(57) ABSTRACT

An automatic messaging client launcher for a communication device automatically launches the communication device's messaging client, when the device is calling a currently unavailable destination communication device. The automatic messaging client launcher consists of an availability detector and a messaging initiator. The availability detector determines if the communication device being called is available. If the destination device is unavailable, the messaging initiator launches the messaging client.

27 Claims, 5 Drawing Sheets

(56) References Cited

U.S. PATENT DOCUMENTS

| | | | |
|---|---|---|---|
| 2003/0193961 A1* | 10/2003 | Moore et al. | 370/401 |
| 2003/0202642 A1* | 10/2003 | Wheeler et al. | 379/88.18 |
| 2004/0002329 A1* | 1/2004 | Bhatia et al. | 455/422.1 |
| 2004/0005042 A1* | 1/2004 | Dhara et al. | 379/142.01 |
| 2004/0022208 A1* | 2/2004 | Dahod et al. | 370/328 |
| 2004/0047303 A1* | 3/2004 | Fernandez et al. | 370/293 |
| 2004/0059781 A1* | 3/2004 | Yoakum et al. | 709/204 |
| 2004/0061718 A1* | 4/2004 | Fitzpatrick et al. | 345/758 |
| 2004/0082317 A1* | 4/2004 | Graefen | 455/413 |
| 2004/0130580 A1* | 7/2004 | Howard et al. | 345/854 |
| 2004/0185828 A1* | 9/2004 | Engelhart | 455/408 |
| 2004/0203766 A1* | 10/2004 | Jenniges et al. | 455/435.1 |
| 2004/0235520 A1* | 11/2004 | Cadiz et al. | 455/557 |
| 2004/0252820 A1* | 12/2004 | Faber et al. | 379/201.12 |
| 2005/0074101 A1* | 4/2005 | Moore et al. | 379/114.01 |
| 2005/0117733 A1* | 6/2005 | Widger et al. | 379/221.05 |
| 2006/0129643 A1* | 6/2006 | Nielson et al. | 709/206 |
| 2007/0121607 A1* | 5/2007 | Gao | 370/356 |

\* cited by examiner

AUTOMATIC MESSAGING CLIENT LAUNCHER FOR A COMMUNICATION DEVICE

BACKGROUND OF THE INVENTION

1. Technical Field of the Invention

The present invention relates to communication messaging and, more particularly, to automatically initiated communication messaging.

2. Description of the Related Art

The communications industry is a fast growing industry, which answers the communication needs of people around the world. Mobile telephones, such as cellular and satellite phones, extend the reach of traditional wireline telephones, and enable users to stay in touch when they would otherwise be inaccessible. Communications carriers are also providing an increasing variety of services to their users. Messaging services (such as Short Message Service) are widely used, and are an important source of revenue for cellular carriers. In view of the growing popularity of messaging services, the availability of messaging services for other types of communication devices is also rising. However, despite the versatility of the available communications networks, no one is truly accessible at all times.

Cellular telephone users now commonly use their cellular telephones not only to call other users, but also to leave voicemail messages, and to send each other text messages. A significant amount of cellular carrier revenues now come from the transmission of Short Message Service (SMS) text messages. In view of the popularity of these services, messaging capability is becoming available for other types of telephones, such as Voice over IP (VoIP) telephones. The range of services provided by communications carriers is expected to increase. Multimedia messaging services (MMS), which expand SMS messaging beyond text to include multimedia content, will soon be widely available. Every additional service that is offered by a communications carrier improves its ability to attract clients and to compete with other carriers. Cellular communication carriers expect that additional services will increase the Average Revenue Per User (ARPU), mainly because of increased airtime, which is the billable duration of the conversation.

Telephone communications carriers routinely provide Voicemail services. Each voicemail-enabled user has an individual voicemail box on a central server. If a call recipient is unavailable to receive an incoming call, a prerecorded greeting is played to the caller. The caller is then able to record a voice message, which is stored in the recipient's voicemail box for access by the recipient at a later time. Voicemail is an important service for both the caller and the recipient. The caller is not obligated to call the same individual repeatedly. The recipient does not miss incoming calls, even when talking to a different individual or when the telephone is disconnected.

Voicemail has several disadvantages. Voicemail services can be cumbersome, as users may be required to listen to lengthy messages and to navigate through various menus in order to send or receive voice messages. The user also pays for airtime while utilizing voicemail services. For these reasons, callers often elect to end the connection rather than leave a voicemail message.

Cellular telephone messaging services, such as SMS and MMS, provide callers with alternative ways of communicating with other users without speaking to them directly. SMS is a transmission service for transmitting short text messages to wireless devices. A SMS message consists of a short text message, up to 160 alphanumeric characters in length. Non-text based short messages (for example, in binary format) are also supported, and are used, for example, for downloading ringtones and for logo services.

The Short Message Service features confirmation of message delivery. Thus, unlike paging, senders of SMS messages can receive a return message notifying them whether the short message has been delivered or not.

The Short Message Service is a store and forward service. SMS messages are not sent directly from sender to recipient, but via a Short Message Service Center (SMSC) that stores each message until the message can be delivered to the appropriate mobile device. If the subscriber is inactive, the SMSC holds the message for a period of time, and delivers the messages when the subscriber accesses the network. Sending SMS messages has become popular with callers, both for providing a new message format (text rather than voice), and because SMS messages are relatively inexpensive to send.

Two new messaging formats, EMS (Enhanced Message Service) and MMS (Multimedia Message Service), are now emerging. EMS adds text formatting, black-and-white images and simple sounds to the unformatted text that SMS supports. Wireless service providers that offer SMS can add EMS with relatively simple upgrades to their network infrastructure.

In comparison with SMS and EMS, MMS provides users with significantly extended messaging capabilities. MMS messages may contain still images, text, audio and video clips, and presentation information, in addition to text. The presentation information defines the way the message content is presented to the user, for example the order in which still images are displayed. An MMS message is displayed to the recipient as a multimedia presentation. The recipient does not need to manually select and open data attached to a message. Like SMS, MMS provides confirmation of message delivery.

MMS messages are not transmitted directly from the caller to the recipient, but are forwarded via a Multimedia Service Center (MMSC) that performs a function analogous to the SMSC. However, the process for MMS transmission to the recipient is different.

When a sender sends an MMS message to a recipient, the message is first sent to the MMSC. The MMSC sends confirmation to the sender that the message was sent. The MMSC then sends the receiver a notification that a new message is waiting. The receiver can download the message immediately or at a later time. Once the message is successfully downloaded, the receiver is notified that the message was received, and the sender is notified that the message was delivered.

SMS and MMS messaging provide cellular clients with attractive alternatives to voicemail. SMS messages are short text messages that are inexpensive for the user, and are quickly transferred to the server over the signaling path. Additionally, once delivered, SMS messages are stored on the cellular device. Commonly, an indicator appears on the cellular device notifying the user that an SMS message has been received. The recipient is therefore more likely to view the message. Further information about messaging services can be found at http://www.mobilesms.com/, the contents of which are hereby incorporated by reference. MMS messaging enables callers to send more elaborate messages, containing a variety of media.

Despite these advantages, SMS and MMS are currently an inconvenient way for a caller to communicate with an unavailable call recipient. If the caller attempts to place a regular call and the recipient does not answer, and the caller wishes to leave an SMS or MMS message, the caller must first hang up, and then manually access the SMS or MMS function on his or her telephone. Accessing a message function on a cellular device often requires navigating through various menus on the device. The message and the target address must be manually input into the device and then transmitted. Confronted by this option, most callers currently prefer to end the call or to leave a voice message and suffer its inconveniences.

There is thus a widely recognized need for, and it would be highly advantageous to have, user-friendly messaging to an unavailable call recipient devoid of the above limitations.

SUMMARY OF THE INVENTION

The invention has been made in view of the above circumstances and to overcome the above problems and limitations of the prior art. The aspects and advantages of the invention will be set forth in part in the description that follows and in part will be obvious from the description, or may be learned by practice of the invention. The aspects and advantages of the invention may be realized and attained by the instrumentalities and combinations particularly pointed out in the appended claims.

According to a first aspect of the present invention, there is provided an automatic messaging client launcher for a communication device. When a communication device with an automatic messaging client launcher places a call to a disconnected, or otherwise unavailable, destination communication device, the automatic messaging client launcher automatically launches the device's messaging client. The automatic messaging client launcher consists of an availability detector and a messaging initiator. The availability detector determines whether the device being called is available. The messaging initiator launches the communication device's messaging client when a called device is unavailable.

According to a second aspect of the present invention, there is provided an automatic messaging client launcher for a communication system. The automatic messaging client launcher automatically sends a message to a communication device calling an unavailable destination communication device. The automatic messaging client launcher consists of an availability detector and a message sender. The availability detector monitors the calls placed by the originating device, and detects whether a destination device is unavailable. If the destination device is unavailable, the message sender sends the originating device a message containing addressing information of the destination device.

According to a third aspect of the present invention, there is provided a method for automatically launching a messaging client on an originating communication device calling a currently unavailable destination communication device. First, the availability of the destination device is determined. Then, if the destination device is unavailable, the originating communication device's messaging client is launched, and provided with destination device addressing information.

According to a fourth aspect of the present invention, there is provided a method for automatically sending a message to an originating communication device calling a currently unavailable destination device. First, the availability of the destination device is determined. Then, if the destination device is unavailable, a message containing destination device addressing information is sent to the originating device.

According to a fifth aspect of the present invention, there is provided a method for automatically launching a messaging client on an originating communication device calling a currently unavailable destination communication device. First, the availability of the destination device is determined. If the destination device is unavailable, a trigger signal is generated. The trigger signal launches the originating communication device's messaging client. Destination device addressing information is then provided to the messaging client.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In addition, the materials, methods and examples are illustrative only and not intended to be limiting.

Implementation of the method and system of the present invention involves performing or completing selected tasks or processes manually, automatically, or a combination thereof. Moreover, according to actual instrumentation and equipment of preferred embodiments of the method and system of the present invention, portions of the method and/or system could be implemented by hardware or by software on any operating system of any hardware or firmware or a combination thereof. For example, as hardware, selected portions of the invention could be implemented as a chip or a circuit. As software, selected portions of the invention could be implemented as a plurality of software instructions being executed by a computer using any suitable operating system. In any case, selected portions of the method and system of the invention could be described as being performed by a data processor, such as a computing platform for executing a plurality of instructions.

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings.

DESCRIPTION OF THE PREFERRED EMBODIMENTS

The present embodiments are of an automatic messaging client launcher for a communication device that enables a user to easily send messages to an unavailable call recipient. Specifically, the present embodiments can be used to open a messaging client on the caller's communication device when a call recipient does not answer a call. The messaging client is launched with a blank or default message pre-addressed to the call recipient.

The principles and operation of an automatic messaging client launcher according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
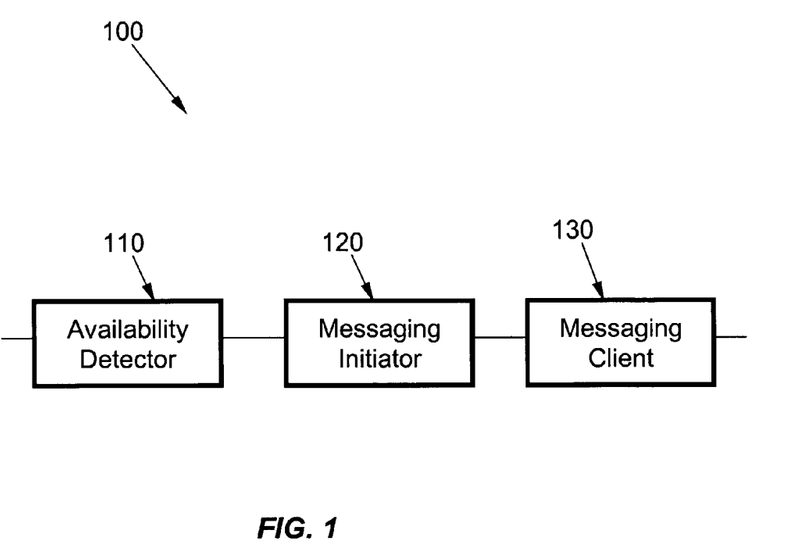
FIG. 1 is a simplified block diagram of a preferred embodiment of an automatic messaging client launcher for a communication device, according to a preferred embodiment of the present invention.

Referring now to the drawings, FIG. 1 is a simplified block diagram of a preferred embodiment of an automatic messaging client launcher for a communication device. The automatic messaging client launcher 100 comprises an availability detector 110 and a messaging initiator 120, which are located on the communication device. When a call is placed from an originating communication device, availability detector 110 monitors the call to determine if the destination device connects. If the destination device does not connect, messaging initiator 120 launches the originating device's messaging client 130, so that the user may conveniently send a message to the unavailable device. The automatic messaging client launcher 100 may be an independent component of the communication device, or may be integrated into the messaging client 130.

The communication device of all the embodiments discussed herein is any communications device with messaging capabilities. These communications devices include cellular telephones, IP telephones (portable and desktop), smart telephones and satellite telephones. Some fixed line telephones are now available with SMS for wireline capabilities.

In the preferred embodiment, availability detector 110 monitors the call from the time the ring tone is present until that call is answered or until a busy signal or any other indication of failure to complete the call is obtained. The availability detector 110 uses signaling information to determine the call progress. For example, signaling information can be received over Signaling System 7 for the number of ring tones. For IP telephones, SIP is used for signaling information in VoIP. The availability detector 110 may use several criteria to determine that a destination device is unavailable, or that the call has not been completed. The destination device may be considered unavailable (i) if a busy signal is detected, (ii) if the call is not answered after a predetermined number of rings, (iii) if the call connects to a voicemail box, or (iv) if an indication is received from the communication carrier that the destination device is offline. An incomplete call is considered to be a voice call between two parties that cannot be completed.

If availability detector 110 determines that the destination device is unavailable, messaging initiator 120 launches the originating device's messaging client 130. The messaging initiator 120 preferably provides the messaging client 130 with addressing information of the unavailable destination device. Generally, the addressing information comprises of the telephone number of the unavailable device, which may be obtained from the memory of the originating communication device. The messaging initiator 120 may be able to detect that a destination communication device does not have messaging capabilities, for example, when calling a land-line telephone, and refrain from launching messaging client 130 in this case.

In the preferred embodiment, the automatic messaging client launcher 100 is integrated into the messaging client 130. In the preferred embodiment, messaging initiator 120 launches the messaging client 130 with the address of the unavailable destination device already defined as the message destination address. The destination address is generally designated in a message destination field, which may be displayed to the user accompanying the message content, or may constitute a portion of the control information accompanying the message. In the preferred embodiment, the destination of the unanswered call is automatically inserted into the appropriate destination field. The message may be an SMS, EMS or MMS message. The caller supplies the message content, which may comprise text, audio clips, video clips, still images, multimedia presentations and voice.

Preferably, the communication device messaging client 130 opens with an input screen. The input screen is displayed to the device user, for user input of message content. In the preferred embodiment, the message input screen contains no content beyond the address of the unavailable device. The user may input the desired message content, either manually or by selecting a predefined message from the communication device memory.

In the preferred embodiment the message constitutes a default message. The message may be a standard message defined by the communication device, or may be definable by the user. The message may include information obtained from the communication device memory, such as the caller name, and the date and time the call was made. The user may send the default message unchanged or may modify or add to the default message.

In the preferred embodiment, the user enters a command in order to send the message. In a further preferred embodiment, a default message is sent automatically when the availability detector 110 determines that the destination is unavailable, without the need for any user input. The message may be an SMS, EMS, MMS or voice message, or any other technologically feasible message type. The user records the default message in the manner necessitated by the type of message being left (e.g., recording a voice message or manipulating a keypad to input a SMS message).

In a further preferred embodiment, automatic messaging client launcher 100 comprises an automatic dialer, which automatically dials a list of numbers input by the user. The automatic dialer stores the telephone numbers entered by the user, so the user does not have to repeatedly enter the same telephone number. If a destination device does not connect, messaging initiator 120 launches the communication device messaging client 130 and a default message is automatically sent to the unavailable device.

Preferably, automatic messaging is activated and deactivated by the user from the communication device. Alternatively, the cellular system operator can control the activation and deactivation of the automatic messaging. In the preferred embodiment, the automatic messaging client launcher 100 is activated globally (i.e., all cellular system operators support automatic messaging), but can also be activated on a per system operator basis as well. In sum, if the cellular system operator supports automatic messaging, the messaging client 130 is launched whenever availability detector 110 determines that the destination device is unavailable. In an additional preferred embodiment, when a destination device is unavailable the user is given a choice of responses, such as leaving an SMS or MMS message, leaving a voice message, or disconnecting without leaving any message. The user may be prompted to make the selection by a recorded message or by a message displayed on the screen, and may input his or her choice from the keyboard or by voice command.

Preferably, messaging initiator 120 launches messaging client 130 in accordance with a set of user-definable rules. These rules may use various criteria available to the messaging initiator 120, such as information within the communication device or a network address book, or the type of ringback or other call progress tone received. The user can thus tailor the messages sent by the messaging client 130 for different purposes. For example, the user may define a category of "Friends" in the device address book. This is different than the network address book described above. Please note that "Friends" category can be defined on either the network address book or on a personal address book. The user's friends can be sent a different message type or a different default message than the message sent to other destination devices. Alternately, these rules may be defined within the messaging client 130. The messaging initiator 120 may then provide additional information (provisioned by the user) required by the messaging client 130 to apply the rules, such as the reason the messaging client 130 was launched (for example, in response to a call-waiting ring or to a number of unanswered rings).

In the preferred embodiment, if availability detector 110 detects that a destination device is unavailable, then the messaging initiator 120 launches the messaging client 130 by mimicking the process that occurs in the device when a message is received from the communications carrier server. A message, which appears to have been sent by the unavailable destination device, is input into the messaging client 130. The input message may be a blank or default message. When the caller replies to the message, the reply is sent to the unavailable destination device. In the preferred embodiment, the unavailable destination device is specified in a message reply field.

Figure 2:
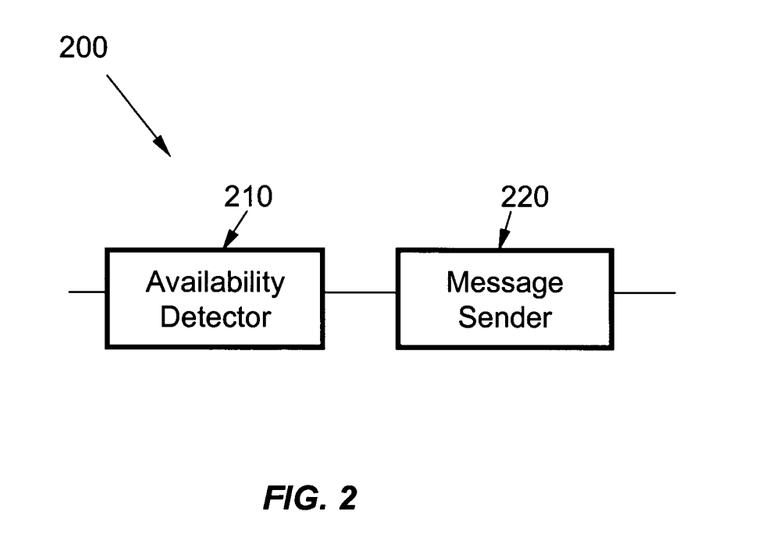
FIG. 2 is a simplified block diagram of an automatic messaging client launcher for a communication system, according to a preferred embodiment of the present invention.

Reference is now made to FIG. 2, which is a simplified block diagram of an automatic messaging client launcher for a communication system. In contrast with the embodiments described above, automatic messaging client launcher 200 operates from within the communication system, and not in the communication device. Automatic messaging client launcher 200 comprises of an availability detector 210, and a message sender 220. Availability detector 210 monitors calls originating from communication devices from system subscribers, as well as calls originating from sources other then system subscribers. If a monitored call does not connect to the destination device, then message sender 220 sends a message containing destination device addressing information to the originating device. The automatic messaging client launcher 200 stores the destination device addressing information, and this addressing information is used for sending a reply to the currently unavailable destination device.

Availability detector 210 monitors the call to determine if the destination device connects. Methods for determining destination unavailability vary, as described above. Additionally, availability detector 210 may have access to telephone network signaling information that can be used to determine if a called device is available.

In the preferred embodiment, the message sent to the originating device by message sender 220 is structured such that when the message is replied to, the reply is addressed to the destination device. In the preferred embodiment, the message sent to the originating device specifies the unavailable destination device in a message reply field.

Commonly, when a communication device receives a message, the device's messaging client is launched. When the originating device receives the message sent by the automatic messaging client launcher 200, the communication device responds to the message as it would respond to any other received message, i.e., it launches the messaging client. When the originating device user replies to the received message, the reply is sent to the unavailable destination communication device.

In the preferred embodiment, automatic messaging can be switched on and off by the user either from the communication device, or via the communications carrier. The communication device comprises a provision section that will allow the user to set and/or change preferences. Alternatively, the user can access a website of the communications carrier and set and/or change preferences.

Figure 3:
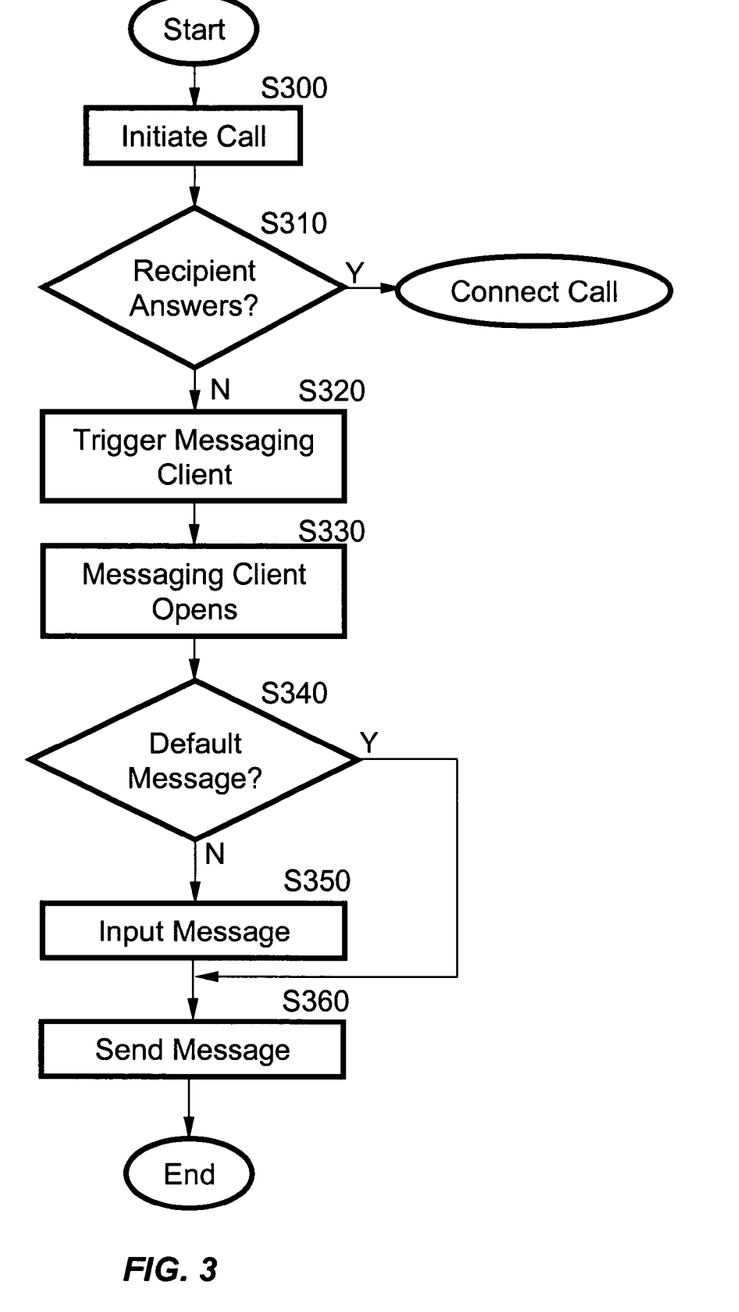
FIG. 3 shows call flow with automatic messaging, according to a preferred embodiment of the present invention.

Reference is now made to FIG. 3, which shows a call flow scenario for automatic messaging. At S300, the caller places a call. At S310, a determination is made whether the call recipient answers. If the recipient answers, the call is put through. Otherwise, a trigger signal is provided to the messaging client, at S320, causing the messaging client to launch. The trigger signal is derived from answer/no-answer data provided in the signaling information. The trigger signal may vary, as described below. If the automatic messaging client launcher is implemented on the communication device, the messaging initiator generates the appropriate launch signal within the communication device. If the automatic messaging client launcher is implemented on the communication system, the trigger signal consists of a message sent to the originating device. Upon receipt of the message, the communication device launches the messaging client. In either case, the messaging client is provided with addressing information of the unavailable device, which may be specified as a destination or reply address for the message. The messaging client opens on the originating device at S330. At S340, it is determined whether a default message is available. If not, the caller inputs a message at S350. Finally, the message is sent at S360.

Figure 4:
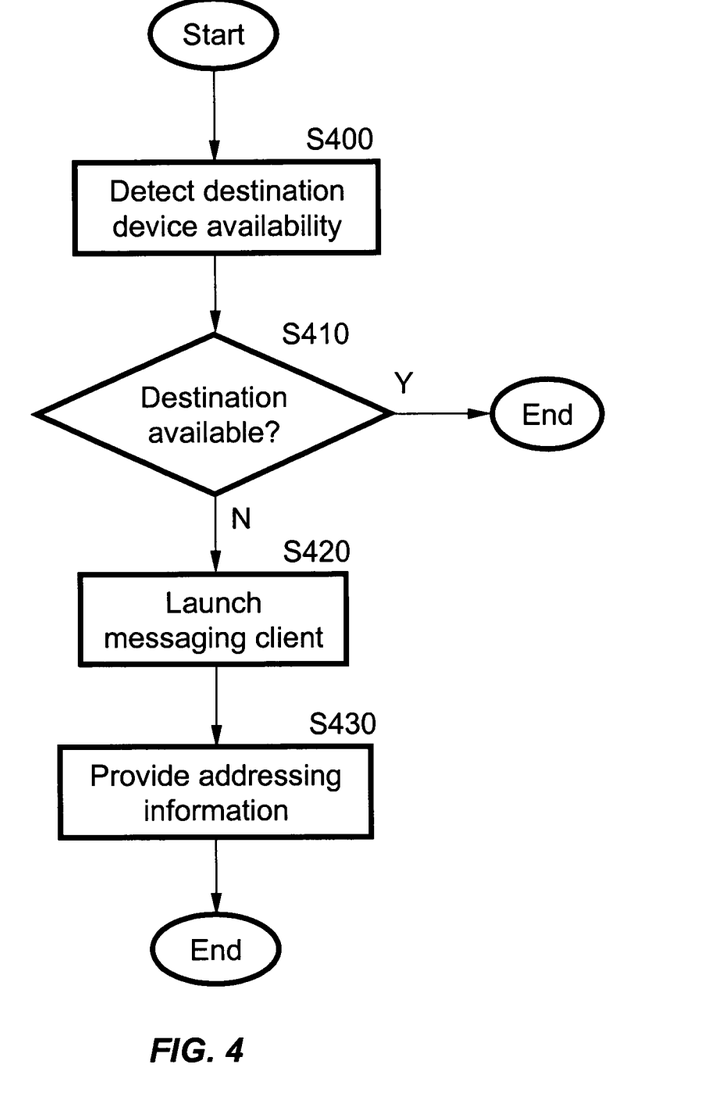
FIG. 4 is a simplified flowchart of a preferred embodiment of a method for automatically launching a messaging client on an originating communication device contacting a currently unavailable destination communication device, according to a preferred embodiment of the present invention.

Reference is now made to FIG. 4, which is a simplified flowchart of a preferred embodiment of a method for automatically launching a messaging client on an originating communication device calling a currently unavailable destination communication device.

At S400, a call placed from an originating device to a destination device is monitored to determine whether the destination device is available. At S410, it is determined whether the destination device is unavailable. Methods for determining destination unavailability vary, as described above. Then, at S420, the messaging client of the originating communication device is launched. At S430, destination device addressing information is provided to the messaging client. Destination device addressing information is provided in accordance with the method used to launch the messaging client, so that the user may send a message to the destination device without manually inputting the destination device address.

The above method can be implemented on, for example, a NOKIA 7650 cellular telephone, using the SYMBIAN operating system. An automatic messaging client launching application can also be developed for Binary Runtime Environment for Wireless (BREW) enabled communication devices. BREW is an application execution environment developed by QUALCOMM that enables the development of applications that facilitate user access to the device's personal information management tools and telephony functions. BREW applications can be developed for both CDMA and GSM phones and networks, and they can be ported to any currently available cellular telephone, regardless of the air-interface technology.

Methods for launching the messaging client may vary. In the preferred embodiment, a trigger signal is provided directly to the messaging client, thereby launching the messaging client. In a further preferred embodiment, the trigger signal is provided at a selected stage in the communication device processing of incoming messages. The trigger signal is equivalent to a signal that would occur at the selected stage if a message were received from the unavailable destination device. When the trigger signal is provided at the selected stage, communication device operation causes the messaging client to be launched.

After the messaging client is launched, the messaging client may display an input screen on the communication device, showing a blank or default message, for user input of message content. The user may use the input screen to input text and/or other data, which may be sent to the destination device upon a user command. The user may be prompted to input the message content. Alternatively, the messaging client may send a default message to the destination device automatically. The message may consist of any technologically feasible message type.

Figure 5:
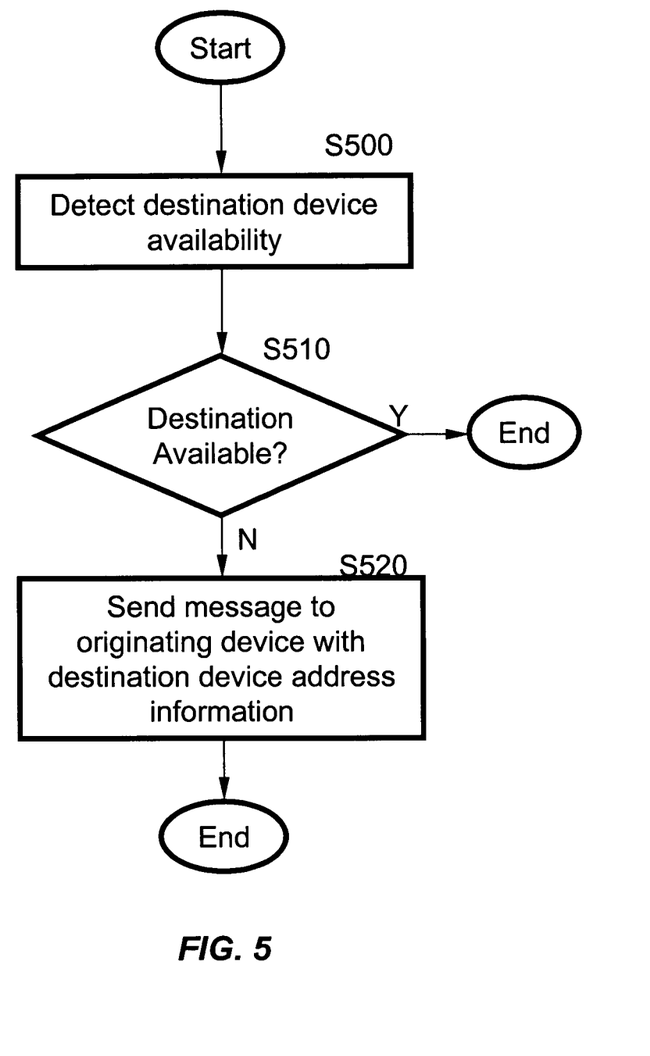
FIG. 5 is a simplified flowchart of a preferred embodiment of a method for sending a message to an originating communication device contacting a currently unavailable destination device, according to a preferred embodiment of the present invention.

Reference is now made to FIG. 5, which is a simplified flowchart of a preferred embodiment of a method for automatically sending a message to an originating communication device calling a currently unavailable destination device. The method of FIG. 5 is performed external to the originating communication device, for example by a mobile communication network. Commonly, when a communication device with messaging capabilities receives a message, the receiving communication device launches its messaging client. An external agent can thus cause a communication device to launch its messaging client by sending a message to the device.

At S500, a call that is sent by the originating device is monitored to detect whether the destination device is available. If it is determined at S510 that the destination device is unavailable, a message is sent to the originating device at S520. The message sent to the originating device contains addressing information of the unavailable destination device, preferably in the source field. Location in the source field is preferred since normal operation of the reply feature will send a message directly to the unavailable destination device. The originating device is expected to respond to the received message as it would to any received message, by launching the messaging client.

Almost every telephone user has been frustrated at one time or another by an inability to contact another user who is offline or busy. Automatic messaging increases the ease with which a caller can send a message to an unavailable destination, and makes messaging a more readily available option. SMS messaging has already proven to be an attractive communication option for many callers. MMS is expected to increase this trend. Communication carriers with automatic messaging capability will be able to provide users with a versatile new service, and will improve their ability to attract clients.

It is expected that during the life of this patent many relevant instant messaging services will be developed and the scope of the term messaging service is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications, and variations that fall within the spirit and broad scope of the appended claims. All publications, patents and patent applications mentioned in this specification are herein incorporated in their entirety by reference into the specification, to the same extent as if each individual publication, patent or patent application were specifically and individually indicated to be incorporated herein by reference. In addition, citation or identification of any reference in this application shall not be construed as an admission that such reference is available as prior art to the present invention.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. An apparatus comprising:
a caller telephone having a messaging client and an availability detector located on said caller telephone,
wherein said availability detector detects availability of a destination telephone when a call is placed from said caller telephone by a user to said destination telephone,
wherein when said availability detector indicates that said destination telephone is unavailable, said messaging client of said caller telephone directly receives a trigger signal so that said messaging client:
(a) in response to said availability detector detecting unavailability of said destination telephone, automatically opens an input screen of a message on said caller telephone having a telephone number of said destination telephone; and (b) upon generating said message that is selected from the group consisting of a short message, enhanced message, and multimedia message, said user of said caller telephone then enters a command to send said message via said caller telephone to said destination telephone in accordance with said telephone number.

2. The apparatus according to claim 1, wherein said caller telephone comprises one of a group of communications devices comprising a telephony device, a mobile communication device, a cellular telephone, an internet protocol (IP) telephone, a smart telephone, and a satellite telephone.

3. The apparatus according to claim 1, further comprising a messaging initiator, wherein said messaging initiator is operable to provide said addressing information to said messaging client.

4. The apparatus according to claim 1, wherein said messaging client is operable to provide said telephone number in a destination field of said message.

5. The apparatus according to claim 1, wherein said message has content that comprises one of a group comprising text, audio, video, still image, multimedia and voice.

6. The apparatus according to claim 1, wherein said message has a content that comprises default message content.

7. The apparatus according to claim 1, wherein said availability detector is operable to detect unavailability of said destination telephone upon an event selected from a group consisting of when said destination telephone does not connect after a predetermined number of rings, when a busy signal is received from said destination telephone, and when a connection is made to a voicemail box of said destination telephone.

8. The apparatus according to claim 1, wherein said caller telephone has a memory, and wherein said telephone number of said destination telephone is obtained from said memory.

9. The apparatus according to claim 1, wherein said message on said caller telephone is generated by opening said input screen displayed to the user for the user to input message content, and wherein said message content is sent in said message.

10. A system comprising:
an originating communication device; and
a communication system comprising an availability detector and a message sender,
wherein said availability detector detects unavailability of a destination device when a call is placed from said originating communication device to a telephone number of said destination device; and
wherein, in response to said availability detector detecting unavailability of said destination device, said message sender associated with said availability detector automatically sends to said originating communication device a first message that appears to have been sent by said destination device comprising said telephone number of said destination device, and wherein said first message is structured so that when said first message is replied to, said reply is addressed to said telephone number of said destination device.

11. The system according to claim 10, wherein said originating communication device is one of a group of communications devices selected from the group consisting of a telephony device, a mobile communication device, a cellular telephone, an internet protocol (IP) telephone, smart telephone, and a satellite telephone.

12. The system according to claim 10, wherein said message sender is operable to provide said telephone number of said destination device in a reply field of said first message.

13. The system according to claim 10, wherein said second message is one of a type selected from the group consisting of voice message, short message, enhanced message, and multimedia message.

14. The system according to claim 10, wherein said second message has a content selected from the group consisting of text, audio, video, still image, multimedia, and voice.

15. The system according to claim 10, wherein said second message comprises default message content.

16. The system according to claim 10, wherein the system is activated and deactivated by a user of said originating communication device.

17. The system according to claim 10, wherein when said availability detector detects that said destination device is unavailable, a messaging client is launched to send said first message to said originating communication device that appears to be sent from said unavailable destination device.

18. A method executed by a caller telephone, comprising:
detecting availability of a destination telephone by said caller telephone when a call is placed from said caller telephone to said destination telephone; and
in response to said destination telephone being detected as unavailable during said detecting, automatically opening an input screen on said caller telephone having a telephone number of said destination telephone to generate a message selected from the group consisting of a short message, enhanced message, and multimedia message.

19. The method according to claim 18, wherein said caller telephone is selected from a group consisting of a telephony device, a mobile communication device, a cellular telephone, an internet protocol (IP) telephone, smart telephone, and a satellite telephone.

20. The method according to claim 18, further comprising said user selecting the message content from one selected from the group consisting of text, audio, video, still image, multimedia, and voice.

21. The method according to claim 18, further comprises generating a default message.

22. The method according to claim 18, wherein said generating said message on said caller telephone comprises opening on said telephone said input screen for user input of message content.

23. The method according to claim 18, wherein said destination telephone unavailability is detected upon an event selected from the group consisting of when said destination telephone does not connect after a predetermined number of rings, when a busy signal is received from said destination telephone, and when a connection is made to a voicemail box of said destination telephone.

24. A method for automatically sending a message to an originating communication device calling a destination device, comprising:
calling a telephone number of the destination device by the originating communication device;
detecting availability of said destination device by a communication system; and
in response to said destination device being detected as unavailable during said detecting, then said communication system automatically sending to said originating communication device a first message that appears to have been sent by said destination device comprising said telephone number of said destination device, wherein said first message is structured so that when said first message is replied to, said reply is addressed to said telephone number of said destination device.

25. The method for automatically sending a message according to claim 24, wherein said originating communication device is selected from the group consisting of a telephony device, a mobile communication device, a cellular telephone, an internet protocol (IP) telephone, smart telephone and a satellite telephone.

26. The method for automatically sending a message according to claim 24, wherein said second message comprises a default message.

27. The method for automatically sending a message according to claim 24, wherein said second message is of a type selected from the group consisting of voice message, short message, enhanced message, and multimedia message.

* * * * *